United States Patent
Heinikoski et al.

(10) Patent No.: US 10,411,743 B2
(45) Date of Patent: *Sep. 10, 2019

(54) CANCELLING INTERMODULATION INTERFERENCE

(71) Applicant: Telefonaktiebolaget LM Ericsson (publ), Stockholm (SE)

(72) Inventors: Kauko Heinikoski, Oulu (FI); Marko E. Leinonen, Haukipudas (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,507

(22) Filed: Mar. 21, 2018

(65) Prior Publication Data

US 2018/0212633 A1 Jul. 26, 2018

Related U.S. Application Data (63) Continuation of application No. 14/422,800, filed as application No. PCT/SE2014/050885 on Jul. 10, 2014, now Pat. No. 9,960,797.

(51) Int. Cl.
*H04L 1/00* (2006.01)
*H04B 1/10* (2006.01)
*H04B 1/525* (2015.01)
*H04L 5/14* (2006.01)
*H04L 27/00* (2006.01)

(52) U.S. Cl.
CPC .......... *H04B 1/1027* (2013.01); *H04B 1/109* (2013.01); *H04B 1/525* (2013.01); *H04L 5/1461* (2013.01); *H04L 27/0008* (2013.01)

(58) Field of Classification Search
CPC ...... H04B 1/1027; H04B 1/109; H04B 1/525; H04L 5/1461; H04L 27/0008
See application file for complete search history.

(56) References Cited

U.S. PATENT DOCUMENTS

| | | | |
|---|---|---|---|
| 7,151,759 B1 * | 12/2006 | Ryan | H03G 3/3078 370/332 |
| 8,249,540 B1 | 8/2012 | Gupta et al. | |
| 2001/0041548 A1 * | 11/2001 | Bult | H03F 3/195 455/252.1 |
| 2007/0184782 A1 * | 8/2007 | Sahota | H04B 1/10 455/63.1 |

(Continued)

FOREIGN PATENT DOCUMENTS

WO 2013131279 A1 9/2013

*Primary Examiner* — Abdelnabi O Musa
(74) *Attorney, Agent, or Firm* — Coats & Bennett, PLLC (57) ABSTRACT

Cancelling of intermodulation interference is described. A digital signal sample (x) is received and a power of the received digital signal sample is obtained. Based on the obtained power, at least one model value is obtained from a model that models model values of a non-linearity in amplitude and phase of a received signal that passes through passive and active components in the receiver. The model values correspond to a plurality of powers of the received signal. Intermodulation interference is then cancelled by multiplying the received digital signal sample with the obtained at least one model value, thereby obtaining an output digital signal sample (y) from which intermodulation interference, inflicted by the receiver, is cancelled.

19 Claims, 5 Drawing Sheets

(56) References Cited

U.S. PATENT DOCUMENTS

| | | | |
|---|---|---|---|
| 2008/0107046 A1 | 5/2008 | Kangasmaa et al. | |
| 2013/0310090 A1* | 11/2013 | Bevan | H04B 1/1027 455/501 |
| 2014/0036969 A1 | 2/2014 | Wyville et al. | |
| 2014/0334349 A1* | 11/2014 | Mao | H04B 1/0475 370/278 |
| 2015/0031317 A1* | 1/2015 | Wang | H04B 1/0475 455/114.3 |

* cited by examiner

CANCELLING INTERMODULATION INTERFERENCE

RELATED APPLICATIONS

This application is a continuation of U.S. application Ser. No. 14/422,800, filed Feb. 20, 2015, which was the National Stage of International Application No. PCT/SE2014/050885, filed Jul. 10, 2014, the disclosures of each of which are incorporated herein by reference in their entirety.

TECHNICAL FIELD

Embodiments herein relate to cancelling intermodulation interference in a receiver in a wireless communication node.

BACKGROUND

A problem related to radio receivers in small wireless communication devices is that the radio frequency (RF) components need to be miniaturized. However, miniaturization of RF components will typically result in RF components that have reduced performance, in terms of noise and RF interference performance etc., than RF components that are not miniaturized, for example components that are used in products such as radio base stations. Furthermore, RF components need to be cost effective and power efficient which sets additional performance challenges. Hence, in order to enable use of such reduced performance RF components while still maintaining good radio performance in radio receivers, improved interference cancellation is needed.

A non-linear RF component generates intermodulation interference signals from a signal which passes the RF component and the intermodulation products typically deteriorate signals received in the receiver. A commonly used parameter for characterizing intermodulation is the so-called third order intercept point. This parameter can be directly measured in the component itself and RF component manufacturers specify this value in data sheets that describe the RF component. The third order intermodulation is typically a dominant source of interference but 5th order, 7th order or any odd order intermodulation products may cause problems in signal reception. Also even order IM distortion may fall in to the received signal frequency in homodyne receivers.

It is therefore of interest to overcome intermodulation distortion which is generated by active components in a receiver, for example a receiver in a wireless communication device. The active components may include any of a low-noise amplifier (LNA), an automatic gain controller (AGC), a mixer, an analogue-to-digital converter (ADC) or any other active component which is a part of a signal chain of a radio receiver. Additionally it is also of interest to overcome passive intermodulation (PIM) of radio frequency filters, for example duplex filters, in devices having receivers and transmitters that utilize at least one common antenna, for example in a wireless communication device.

US patent application publication US 2012/0295558 describes dynamic cancellation of passive intermodulation interference. The method presented in US 2012/0295558 is requires a test signal that originates from a transmitter to be able to correct PIM interference. If the interference is generated in the receiver filters or any other receiver signal path component the solution based on US 2012/0295558 will not be applicable.

SUMMARY

In view of the above there is a need for improving the ways in which intermodulation interference is handled in receivers in wireless communication nodes. An object of the present disclosure is to provide embodiments of how to accomplish this object.

Hence, in one aspect there is provided a method, performed by a receiver, for cancelling intermodulation interference. The method comprises receiving a digital signal sample and obtaining a power of the received digital signal sample. Based on the obtained power, at least one model value is obtained from a model that models model values of a non-linearity in amplitude and phase of a received signal that passes through passive and active components in the receiver. The model values correspond to a plurality of powers of the received signal. Intermodulation interference is then cancelled by multiplying the received digital signal sample with the obtained at least one model value, thereby obtaining an output digital signal sample from which intermodulation interference, inflicted by the receiver, is cancelled.

In some embodiments, the model values, in addition to correspond to a plurality of powers of the received signal, also correspond to a plurality of temperature values that represent temperatures of the passive and active components in the receiver. Consequently, in these embodiments, the method further comprises determining a temperature value that represents a temperature of the passive and active components in the receiver and the obtaining of a value from a model is based also on the determined temperature.

In other words, intermodulation interference that is a consequence of active components, duplex filters or any filter along a reception signal path in a receiver is mathematically modeled which is used to post correct a received signal intermodulation distortion component (i.e. intermodulation interference). Correction is applied as a function of the power or amplitude of the received signal and/or temperature.

In some embodiments, the model is a predetermined fixed algorithm and in some embodiments, the model is an adaptive algorithm. In the adaptive model embodiments, the method further comprises updating the model based on a quality (e.g. signal to interference ratio, signal to noise ratio, bit error rate, error vector magnitude etc.) of the received signal, and/or by minimizing a difference between the received signal and an expected received signal (such as a pilot or reference signal). In such adaptive model embodiments, the updating of the model is triggered, i.e. the updating is performed in response to a determination that the quality of the received signal is below a threshold quality, and/or that the difference between the received signal and an expected received signal is greater than a difference threshold.

In some embodiments, the model is in the form of a lookup table (LUT). The model values of the model are in such embodiments in the form of LUT values that are indexed in the LUT by the obtained power. In some of these embodiments where the model values also correspond to a plurality of temperature values, the model values of the model are indexed in the LUT by the obtained power and also indexed in the LUT by the temperature.

In some embodiments, a power of a blocking signal in the receiver and a power of the received signal sample are determined. The step of multiplying the received digital signal sample with the obtained at least one model value is in these embodiments done if the power of the blocking signal is higher than a first threshold and/or if the power of the received digital signal sample is lower than a second threshold. In other words, the cancellation of the intermodulation interference is in such embodiments conditioned on an incoming reception signal (combined interference and wanted signal) being in excess of a pre-determined threshold level and/or that the wanted received signal is weaker than another pre-determined threshold level.

In another aspect there is provided a receiver that comprises radio frequency circuitry, a processor and a memory. The memory contains instructions executable by the processor whereby the receiver is operative to control the receiver by receiving a digital signal sample and obtaining a power of the received digital signal sample. Based on the obtained power, at least one model value is obtained from a model that models model values of a non-linearity in amplitude and phase of a received signal that passes through passive and active components in the receiver. The model values correspond to a plurality of powers of the received signal. Intermodulation interference is then cancelled by multiplying the received digital signal sample with the obtained at least one model value, thereby obtaining an output digital signal sample from which intermodulation interference, inflicted by the receiver, is cancelled.

In other aspects, a transceiver comprises such a receiver and a transmitter and a wireless communication node comprises such a receiver.

In another aspect there is provided a computer program, comprising instructions which, when executed on at least one processor in a wireless communication node, cause the wireless communication node to carry out the method as summarized above.

In another aspect there is provided a carrier comprising such a computer program, wherein the carrier is one of an electronic signal, an optical signal, a radio signal and a computer readable storage medium.

These aspects provide the same effects and advantages as summarized above.

BRIEF DESCRIPTION OF THE DRAWINGS

FIG. 2b schematically illustrates a detail of the receiver in FIG. 2a.

DETAILED DESCRIPTION

Figure 1A:
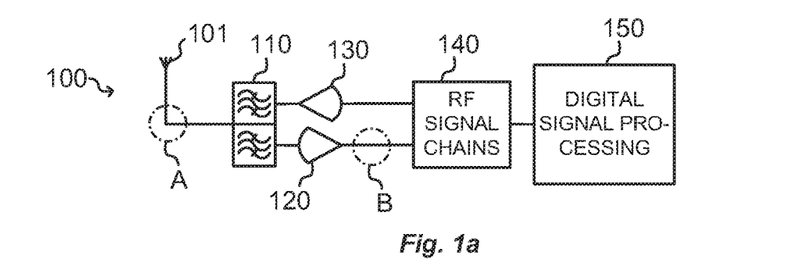
FIG. 1a schematically illustrates a wireless communication node.
Figure 1B:
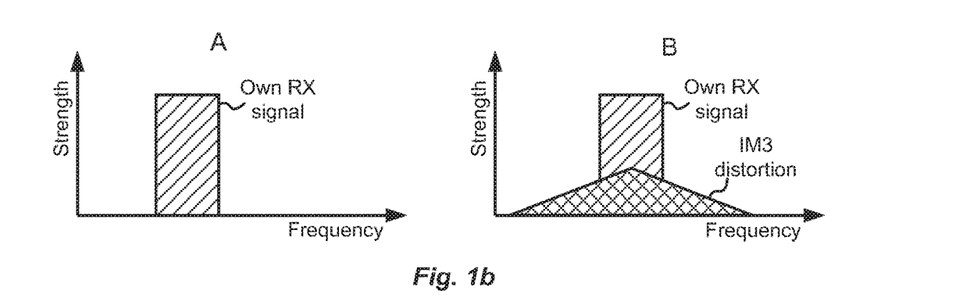
FIGS. 1b-d are schematically illustrated graphs of signals and interfering signals.
Figure 1C:
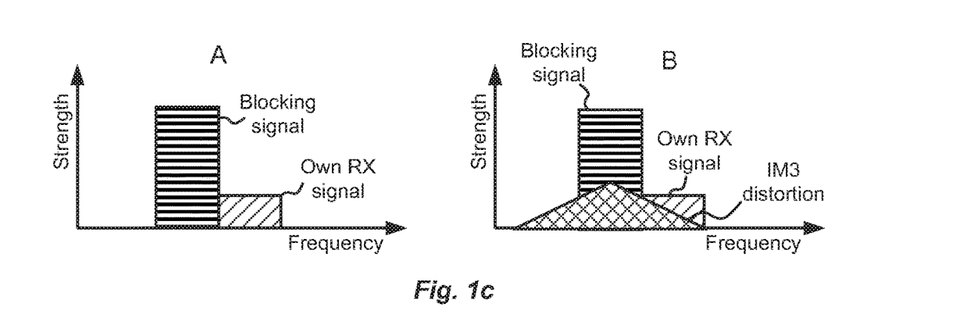

FIGS. 1a-c illustrate in some more detail problems that the present disclosure addresses. The schematically presented block diagram in FIG. 1a is a simplified presentation of radio transceiver 100. The transceiver 100 comprises an antenna 101, a duplex filter 110, a low noise amplifier 120, a power amplifier 130, RF signal chains 140, which comprises (not shown in FIG. 1a) variable gain amplifiers, frequency mixers, intermediate frequency (IF) and/or base band filters etc. The transceiver also comprises a digital signal processing block 150, which may be implemented with a field-programmable gate array (FPGA), central processing unit (CPU) or any other appropriate digital processing means.

As briefly discussed above, if a received signal is deteriorated with an inference signal generated by a receive signal path intermodulation signal product and this interference degrades the received signal quality, measures need to be taken in order to restore the quality of the received signal. If the interference signal is known (i.e. frequency and amplitude and phase are known) then it could be compensated in the receiver in the digital signal processing block 150. There are at least three different mechanisms for generating the interference signals in the receiving signal chain:

First Interference Generating Mechanism (FIG. 1b):
A wanted modulated signal, i.e. an own received (RX) signal is illustrated at reference A in FIG. 1a and illustrated by a slanted striped area in graph A in FIG. 1b. This own RX signal generates itself third order intermodulation distortion (IM3) signal products that are generated within the modulation band width of the own RX signal. This IM3 distortion is illustrated schematically by a hashed area in graph B in FIG. 1b.

More specifically, the own RX signal causes interference due to non-linear behavior of RF components through which the signal passes, exemplified by blocks 110 and 120 in FIG. 1a. At the antenna 101 only the modulated own RX signal is present and when the signal passes through components in blocks 110 and 120, intermodulation distortion (IMD) will be generated top of the own RX signal. The intermodulation products depend on the signal modulation bandwidth, i.e. the bandwidth of the own RX signal. The reason for this is that individual signal components within the modulation band width can be considered independent signals that may produce intermodulation products. Thus the width of the intermodulation signal, i.e. the IM3 distortion, is three times wider than modulation band width, when the interference is based on 3rd order non-linearity (as is the case illustrated here).

Second Interference Generating Mechanism (FIG. 1c):
One blocking interference signal, illustrated by a horizontally striped area together with the own RX signal in graph A in FIG. 1c, generates IM3 distortion that is generated at least partly over the modulation signal band width of the own signal as illustrated in FIG. 1c.

More specifically, the blocking interfering signal generates, e.g., 3rd order interference adjacent to frequencies where the own RX signal is located. At the antenna 101, the own RX signal and the blocking signal are at different frequencies. When the blocking signal passes through components in blocks 110 and 120, the IM3 distortion is generated. Some interference signal components may fall on top of the own RX signal and thus the quality of received signal or a signal to noise/interference ratio of the own RX signal will be degraded. A level of the interference signal components is dependent on the signal level of the blocking signal and the characteristics of the linearity (e.g. as defined by the so-called Input Intercept Point 3 (IIP3) of the RF component). The closer the blocking signal level is to the IIP3 point, the higher are the levels of the interference signal products.

Third Interference Generating Mechanism (FIG. 1d):
Two or more blocking interference signals illustrated by a respective first and second horizontally striped area together with the own RX signal in graph A in FIG. 1d, generate IM3 distortion that is generated at least partly over the modulation signal band width of the wanted signal band width as illustrated in FIG. 1d.

More specifically, the two interfering signals are present at the antenna 101 and those signals are mixed with each other due to non-linearity of the RF components through which they pass to produce an interference signal product in the (frequency) vicinity of the own RX signal. When the two blocking signals are separated in the frequency domain by a delta (Δ) frequency then the intermodulation products will appear Δ-frequency apart from the blocking signals themselves.

Figure 1D:
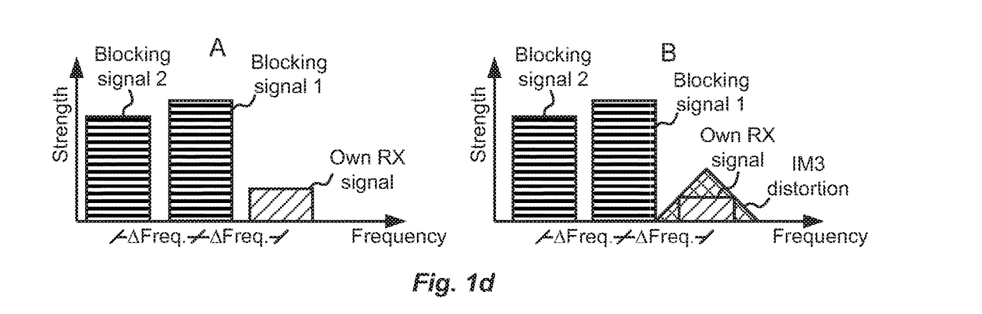

It is to be noted that FIGS. 1b-d illustrate how spectrum is changed due to non-linear elements 110 and 120 in the signal chain. However, similar spectrum figures can be seen in any point along the signal path from the antenna 101 to the digital signal processing block 150.

Figure 2A:
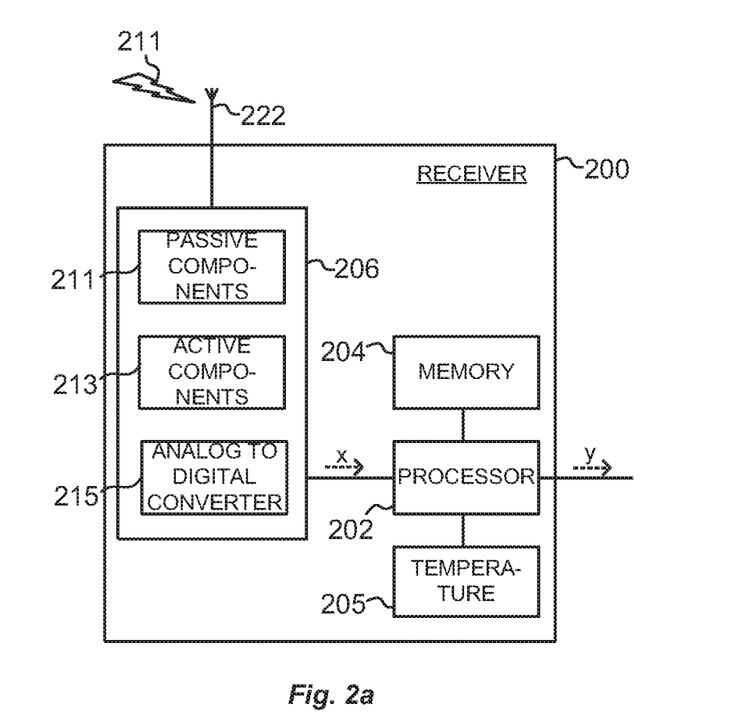
FIG. 2a schematically illustrates a receiver.

Turning now to FIGS. 2a, 2b, 3 and 4, embodiments of intermodulation cancellation will be described in some more detail. The embodiments will relate to processing in a digital domain, i.e. in digital processing circuitry such as block 150 in FIG. 1, where digitized samples of signals are processed. In FIG. 2a, a receiver 200 comprises an antenna 222 that receives a modulated signal 211 that passes through an RF signal chain 206. The RF signal chain 206 comprises passive components 211, active components 213 and an analog-to-digital converter 215, which outputs the digital signal sample x. The digital signal sample x includes, as discussed above in connection with FIGS. 1a-d, an own RX signal component as well as any blocking signal(s) and IM3 (or higher order) distortion components.

Figure 2B:
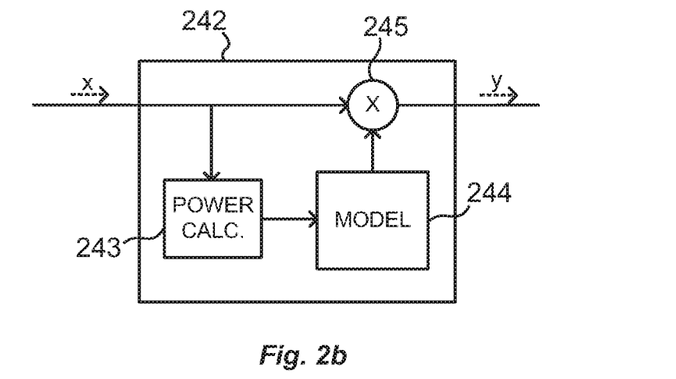

The digital signal sample x is processed in digital processing circuitry, which in FIG. 2a is illustrated with a processor 202 to which a memory 204 is connected. FIG. 2b illustrates a part 242 of the processor 202. As will be discussed later, temperature data 205 may in some embodiments be utilized. In short, embodiments will be described that correct IMD products from the received signal bandwidth by generating an opposite phase and amplitude signals for the IMD products, the result being an IMD distortion (i.e. interference) free wanted signal. This resulting interference free signal is in FIG. 2a denoted y.

As FIG. 2a shows, the RF signal chain 206 is connected to the processor 202 and although the signal sample x is the only signal illustrated, it is to be noted that other information may be exchanged between the RF signal chain 206 and the processor 202. For example, the active components 213 comprise one or more variable gain amplifiers (VGA) that may be controlled by control signals provided by the processor 202. The active components 213 may also comprise one or more low noise amplifiers (LNA) that is configured such that information about a signal at an input of the LNA is available for use by the processor. The processor 202 may execute an AGC algorithm that operates to control the VGA.

Figure 3:
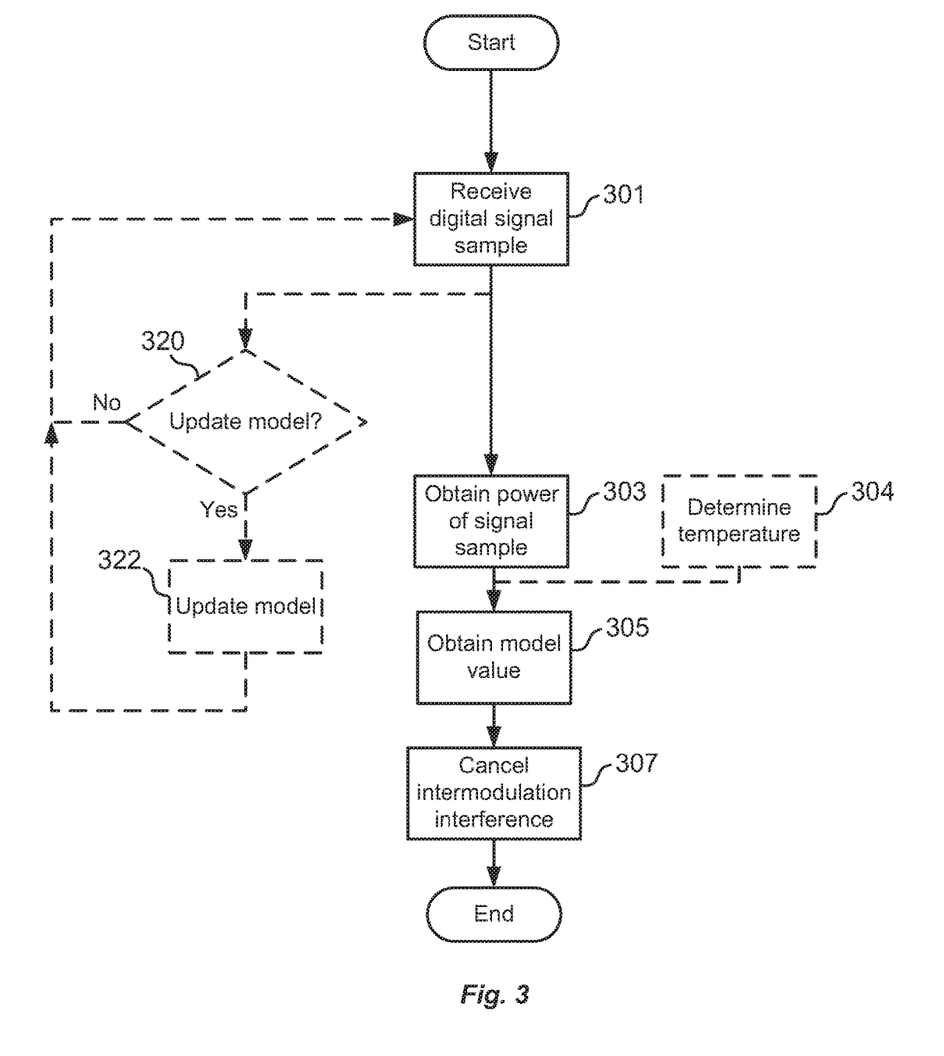
FIG. 3 is a flow chart of an embodiment of a method.

In FIG. 3, a flow chart illustrates a method performed by a wireless communication node comprising a receiver, such as the receiver 200 in FIG. 2a. The method is for cancelling intermodulation interference as discussed above and it comprises a number of actions as follows:

Action 301
A digital signal sample x is received. As discussed above, the digital signal x may comprise a wanted modulated signal (i.e. an own signal) and any undesirable distortions that are due to intermodulation.

Action 303
A power of the received digital signal sample x is obtained. In various alternative embodiments, this obtaining of the power of the received digital signal sample may comprise performing a calculation in a power calculator 243 that involves integrated sliding window power detection. The obtaining of power of the received digital signal sample may alternatively comprise a power calculation by use of an integrator implemented by way of an infinite impulse response, IIR, filter. The signal power may be expressed as $|x|^2=I^2+Q^2$, where I and Q are the in-phase component and the quadrature phase component of the received digital signal sample x. It is to be noted that, for the purpose of the embodiments herein, the power may be expressed in the form of the amplitude of the received digital signal x, i.e. the power may be expressed by $|x|$.

Moreover, the obtaining of a power of the received digital signal sample may in various embodiments comprise obtaining the power from an AGC algorithm that operates to control a VGA in the active components 213 in the receiver 200. In various embodiments, the obtaining of a power of the received digital signal sample may comprise obtaining the power from an input of a low noise amplifier, LNA, in the active components 213 in the receiver.

Action 305
Based on the obtained power, at least one model value is obtained from a model 244. The model 244 is such that it models model values of a non-linearity in amplitude and phase of a received signal that passes through the passive components 211 and the active components 213 in the receiver 200. The model values correspond to a plurality of powers of the received signal and they may, in some embodiments, be complex values and in some embodiments the model values are Volterra polynomial coefficients.

In some embodiments, the model values, in addition to correspond to a plurality of powers of the received signal, also correspond to a plurality of temperature values that represent temperatures of the passive components 211 and active components 213 in the receiver 200. In such embodiments, a determination is made, in action 304, of a temperature value that represents a temperature of the passive and active components 211, 213 in the receiver 200. The obtaining of a value from a model 244 is then based also on the determined temperature.

The model 244 may be a predetermined fixed algorithm. That is, in such embodiments, the model 244 has been calculated and the model values are pre-determined and available to be obtained. For example, the model may have originated as a result of measurements and calculations during research and development of the receiver and/or at a later production stage calibration to match a nonlinear behaviour of the receiver.

In other embodiments, the model 244 is an adaptive algorithm. In such embodiments, the model 244 may be updated based on a quality of the received signal, and in some embodiments updated by minimizing a difference between the received signal and an expected received signal. Such model updating may in some embodiments be performed in response to a determination that the quality of the received signal is below a threshold quality and in some embodiments in response to a determination that the difference between the received signal and an expected received signal is greater than a difference threshold. In these embodiments, the quality of the received signal may be any of signal to interference ratio, signal to noise ratio, bit error rate, and error vector magnitude. These various embodiments are illustrated in FIG. 3 by the optional actions 320 and 322.

Furthermore, some embodiments involve a representation of the model 244 in the form of a lookup table, LUT, and wherein the model values of the model are in the form of LUT values that are indexed in the LUT by the obtained power. In the embodiments where the model values also correspond to a plurality of temperature values, the model values of the model 244 are indexed in the LUT by the obtained power and indexed in the LUT also by the temperature.

In such embodiments where a LUT is used, the LUT may indexed as a function of signal instant signal power, $|x|^2=I^2+Q^2$, where I and Q are the in-phase component and the quadrature phase component of the received signal sample x. The instant power is calculated for each sample of received signal x and a correction value is selected from the LUT based on the calculated index and the selected value is multiplied with the received signal. For example, the calculation of the index may be in the form of obtaining the N most significant bits of calculated $|x|^2$ power value. The LUT may be a complex LUT, meaning that amplitude and phase non-linearity of the signal can be modelled. Distortion mechanisms are assumed to be more or less memory less and therefore memory less LUT implementation is typically sufficient. If higher performance is required, more LUTs may be added to model memory effects.

Action 307
Intermodulation interference is cancelled by multiplying in a multiplier 245 the received digital signal sample x with the obtained at least one model value. The output digital signal sample y is thereby obtained from which intermodulation interference, inflicted by the receiver 200, is cancelled.

Figure 4:
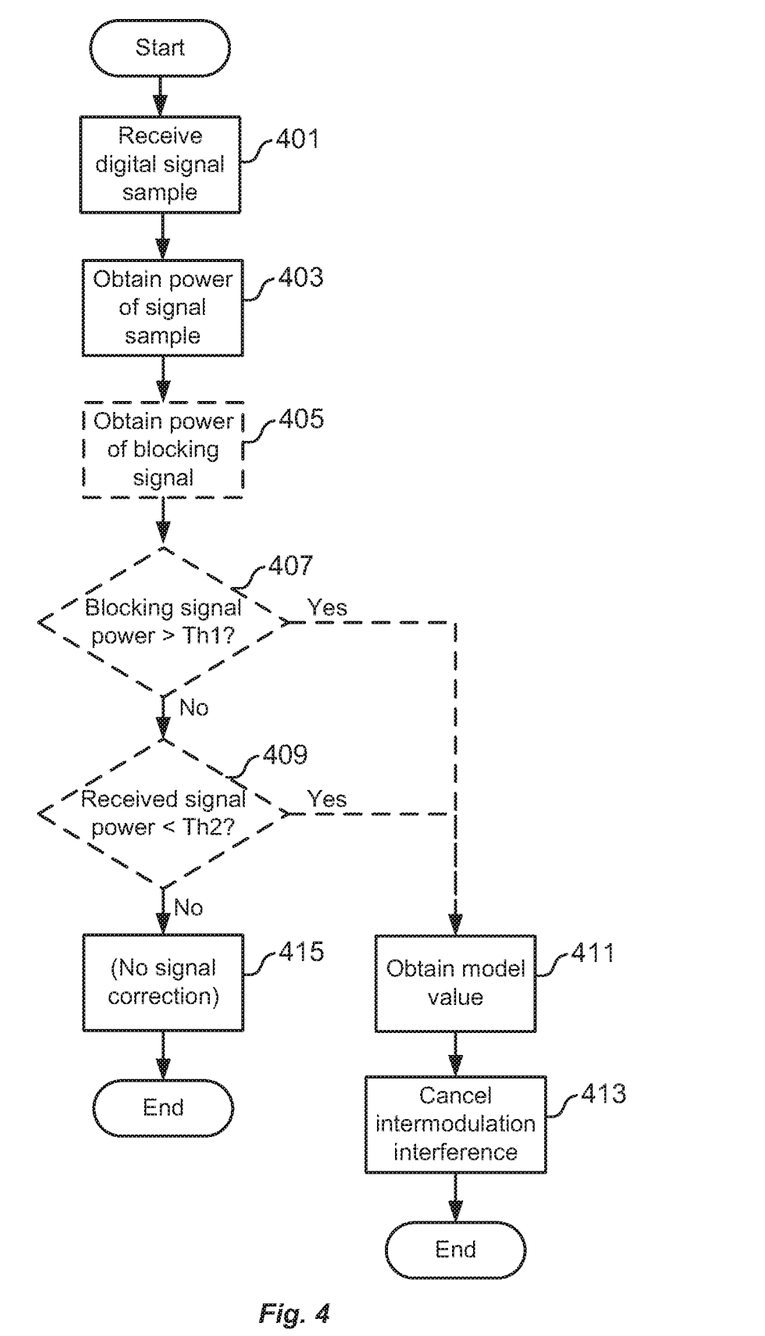
FIG. 4 is a flow chart of embodiments of a method.

In order to save processing resources, some embodiments are such that they impose a condition on the cancellation of the interference. Such embodiments are illustrated in FIG. 4.

Action 401
As in the embodiments including action 301, a digital signal sample x is received.

Action 403
As in the embodiments including action 303, a power of the received digital signal sample x is obtained.

Action 405
A power of a blocking signal in the receiver is determined. This determination may be performed by, e.g., the same method as for the received signal power calculation as described above in connection with action 303. A blocking signal may be separated from a desired signal, e.g., with a digital filter applied prior to the power calculation.

Actions 407 and 409
Checks are made if the power of the blocking signal is higher than a first threshold and/or if the power of the received digital signal sample is lower than a second threshold.

Actions 411 and 413
If it is found in the checks in action 407 and/or action 409 that the power of the blocking signal is higher than a first threshold and/or that the power of the received digital signal sample is lower than a second threshold, then at least one model value is obtained as already described above and the received digital signal sample is multiplied with the obtained at least one model value as already described above.

Action 415
If it is found in the checks in action 407 and/or action 409 that the power of the blocking signal is not higher than a first threshold and that the power of the received digital signal sample is not lower than a second threshold, then no signal correction is performed. Consequently, in such a case (where the signal level of the wanted received signal is good and at the same time any blocking signal is low) processing power can be saved by not doing any correction to the received signal sample x.

Figure 5:
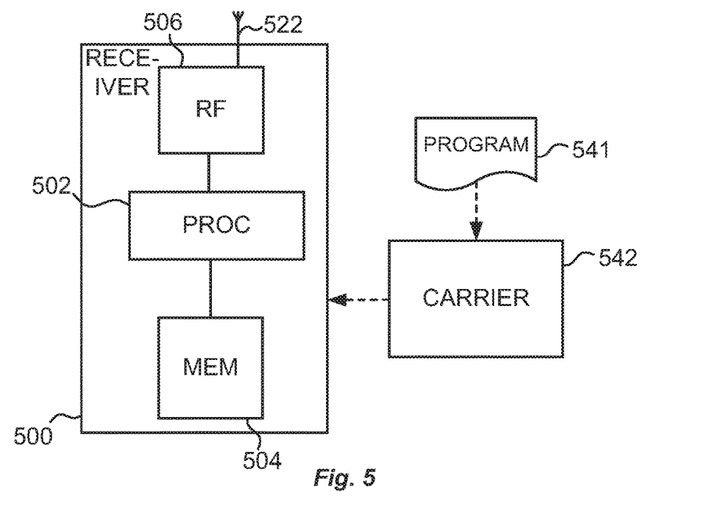
FIG. 5 schematically illustrates a receiver.

Turning now to FIG. 5, a receiver 500 will be described. The receiver 500 may be a receiver such as the receiver 200 in FIG. 2a as well as a receiver in a transceiver such as the transceiver 100 in FIG. 1a. The receiver 500 comprises an antenna 522, radio frequency circuitry 506, a processor 502 and a memory 504, the memory 504 containing instructions executable by the processor 502 whereby the receiver 500 is operative to control the receiver 500 by:

receiving a digital signal sample,
obtaining a power of the received digital signal sample,
obtaining, based on the obtained power, at least one model value from a model that models model values of a non-linearity in amplitude and phase of a received signal that passes through passive and active components in the receiver, the model values corresponding to a plurality of powers of the received signal,
cancelling intermodulation interference by multiplying the received digital signal sample with the obtained at least one model value, thereby obtaining an output digital signal sample from which intermodulation interference, inflicted by the receiver, is cancelled.

The receiver 500 may be operative to control the receiver such that the model values, in addition to correspond to a plurality of powers of the received signal, also correspond to a plurality of temperature values that represent temperatures of the passive and active components in the receiver, and operative to control the receiver 500 by:

determining a temperature value that represents a temperature of the passive and active components in the receiver, and wherein the obtaining of a value from a model is based also on the determined temperature.

The receiver 500 may be operative to control the receiver 500 such that the model is a predetermined fixed algorithm.

The receiver 500 may be operative to control the receiver 500 such that the model is an adaptive algorithm and operative to control the receiver 500 by:

updating the model based on a quality of the received signal, and
updating the model by minimizing a difference between the received signal and an expected received signal.

The receiver 500 may be operative to control the receiver 500 such that the updating is performed in response to any of:

determining that the quality of the received signal is below a threshold quality, and
determining that the difference between the received signal and an expected received signal is greater than a difference threshold.

The receiver 500 may be operative to control the receiver 500 such that the quality of the received signal is any of:
signal to interference ratio,
signal to noise ratio,
bit error rate, and
error vector magnitude.

The receiver 500 may be operative to control the receiver 500 such that the model is in the form of a lookup table, LUT, and wherein the model values of the model are in the form of LUT values that are indexed in the LUT by the obtained power.

The receiver 500 may be operative to control the receiver 500 such that the model values of the model are indexed in the LUT by the obtained power and indexed in the LUT by the temperature.

The receiver 500 may be operative to control the receiver 500 by:

determining a power of a blocking signal in the receiver, and
if the power of the blocking signal is higher than a first threshold and/or if the power of the received digital signal sample is lower than a second threshold, then multiplying the received digital signal sample with the obtained at least one model value.

The receiver 500 may be operative to control the receiver 500 such that the obtaining of a power of the received digital signal sample comprises any of:
integrated sliding window power detection, and
power calculation by use of an integrator implemented by way of an infinite impulse response, IIR, filter.

The receiver 500 may be operative to control the receiver 500 such that the obtaining of a power of the received digital signal sample comprises obtaining the power from an automatic gain control, AGC, algorithm that operates to control a variable gain amplifier, VGA, in the receiver.

The receiver 500 may be operative to control the receiver 500 such that the obtaining of a power of the received digital signal sample comprises obtaining the power from an input of a low noise amplifier, LNA, in the receiver.

The receiver 500 may be operative to control the receiver 500 such that the model values are complex values, for example in the form of Volterra polynomial coefficients.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

Figure 6:
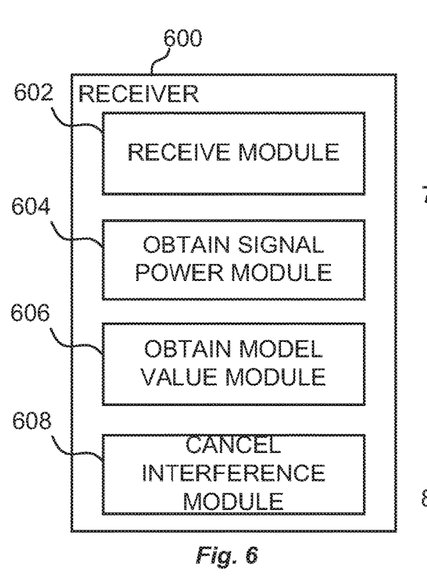
FIG. 6 schematically illustrates a receiver.

Turning now to FIG. 6, a receiver 600 will be described. The receiver 600 may be a receiver such as the receiver 200 in FIG. 2a as well as a receiver in a transceiver such as the transceiver 100 in FIG. 1a. The receiver 600 comprises:
a receive module 602 configured to receive a digital signal sample,
an obtain signal module 604 configured to obtain a power of the received digital signal sample,
an obtain model value module 606 configured to obtain, based on the obtained power, at least one model value from a model that models model values of a non-linearity in amplitude and phase of a received signal that passes through passive and active components in the receiver, the model values corresponding to a plurality of powers of the received signal,
a cancel interference module 608 configured to cancel intermodulation interference by multiplying the received digital signal sample with the obtained at least one model value, thereby obtaining an output digital signal sample from which intermodulation interference, inflicted by the receiver, is cancelled.

The node 600 may comprise further modules that are configured to operate in a similar manner as the node described above in connection with FIG. 5.

Figure 7:
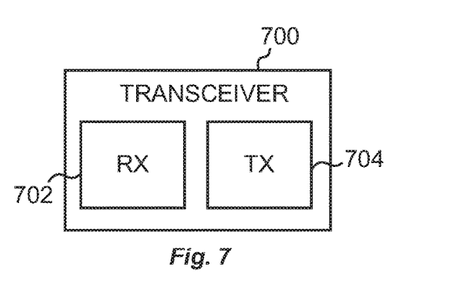
FIG. 7 schematically illustrates a transceiver.

An embodiment of a transceiver 700 is illustrated in FIG. 7. The transceiver 700 comprises a receiver 702 and a transmitter 704. The receiver 702 may be a receiver such as the receivers described above in connection with FIGS. 1 to 6.

Figure 8:
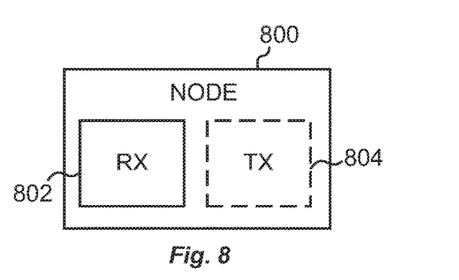
FIG. 8 schematically illustrates a wireless communication node.

An embodiment of a wireless communication node 800 is illustrated in FIG. 8. The wireless communication node 800 comprises a receiver 802 and, optionally, a transmitter 804. The receiver 802 may be a receiver such as the receivers described above in connection with FIGS. 1 to 6.

As used herein, the term "processing module" or "module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a receiver, for cancelling intermodulation interference, the method comprising:
obtaining a power of a digital signal sample received by the receiver;
generating, according to a model, a plurality of model values corresponding to a plurality of powers of the received signal; and
cancelling intermodulation interference by multiplying the received digital signal sample with at least one model value of the plurality of model values, thereby obtaining an output digital signal sample from which intermodulation interference, inflicted by the receiver, is cancelled.

2. The method of claim 1, wherein the plurality of model values also correspond to a plurality of temperature values that represent temperatures of passive and active components in the receiver through which a received signal passes; the method further comprising:
determining a temperature value that represents a temperature of the passive and active components in the receiver; and
obtaining the at least one model value is based also on the determined temperature.

3. The method of claim 2, wherein the model is an adaptive algorithm; wherein the method further comprises at least one of:
   updating the model based on a quality of the received signal; and
   updating the model by minimizing a difference between the received signal and an expected received signal.

4. The method of claim 3, wherein the updating the model is performed in response to any of:
   determining that the quality of the received signal is below a threshold quality; and
   determining that the difference between the received signal and an expected received signal is greater than a difference threshold.

5. The method of claim 4, wherein the quality of the received signal is any of:
   a signal to interference ratio;
   a signal to noise ratio;
   a bit error rate; and
   an error vector magnitude.

6. The method of claim 1, wherein the model is a predetermined fixed algorithm.

7. The method of claim 1:
   wherein the model is in the form of a lookup table (LUT); and
   wherein the plurality of model values are in the form of LUT values that are indexed in the LUT by the obtained power.

8. The method of claim 7:
   wherein the plurality of model values also correspond to a plurality of temperature values that represent temperatures of the passive and active components in the receiver;
   the method further comprising determining a temperature value that represents a temperature of the passive and active components in the receiver; and
   wherein the obtaining of a model value from a model is based also on the determined temperature;
   wherein the plurality of model values of the model are indexed in the LUT by obtained power and indexed in the LUT by temperature.

9. The method of claim 1, further comprising:
   determining a power of a blocking signal in the receiver; and
   in response to the power of the blocking signal being higher than a first threshold and/or the power of the received digital signal sample being lower than a second threshold, multiplying the received digital signal sample with the obtained at least one model value.

10. The method of claim 1, wherein the obtaining of a power of the received digital signal sample comprises any of:
    integrated sliding window power detection; and
    power calculation by use of an integrator implemented by way of an infinite impulse response (IIR) filter.

11. The method of claim 1, wherein the obtaining of a power of the received digital signal sample comprises obtaining the power from an automatic gain control (AGC) algorithm that operates to control a variable gain amplifier (VGA) in the receiver.

12. The method of claim 1, wherein the obtaining of a power of the received digital signal sample comprises obtaining the power from an input of a low noise amplifier (LNA) in the receiver.

13. The method of claim 1, wherein the plurality of model values are complex values.

14. The method of claim 13, wherein the plurality of model values are Volterra polynomial coefficients.

15. The method of claim 1, wherein the model represents a non-linearity in amplitude and phase of a received signal that passes through passive and active components in the receiver.

16. A receiver, comprising:
    radio frequency circuitry;
    a processor;
    memory operatively coupled to the processor and containing instructions executable by the processor to cause the receiver to:
      obtain a power of a digital signal sample received by the receiver;
      generate, according to a model, a plurality of model values corresponding to a plurality of powers of the received signal; and
      cancel intermodulation interference by multiplying the received digital signal sample with at least one model value of the plurality of model values, thereby obtaining an output digital signal sample from which intermodulation interference, inflicted by the receiver, is cancelled.

17. A transceiver, comprising:
    a transmitter;
    a receiver comprising:
    radio frequency circuitry;
    a processor;
    memory operatively coupled to the processor and containing instructions executable by the processor to cause the receiver to:
      obtain a power of a digital signal sample received by the receiver;
      generate, according to a model, a plurality of model values corresponding to a plurality of powers of the received signal; and
      cancel intermodulation interference by multiplying the received digital signal sample with at least one model value of the plurality of model values, thereby obtaining an output digital signal sample from which intermodulation interference, inflicted by the receiver, is cancelled.

18. A wireless communication node, comprising:
    a receiver comprising:
      radio frequency circuitry;
      a processor;
      memory operatively coupled to the processor and containing instructions executable by the processor to cause the receiver to:
        obtain a power of a digital signal sample received by the receiver;
        generate, according to a model, a plurality of model values corresponding to a plurality of powers of the received signal; and
        cancel intermodulation interference by multiplying the received digital signal sample with at least one model value of the plurality of model values, thereby obtaining an output digital signal sample from which intermodulation interference, inflicted by the receiver, is cancelled.

19. A computer program product stored in a non-transitory computer readable medium for controlling a wireless communication node, the computer program product comprising software instructions which, when run on one or more processors of the wireless communication node, causes the wireless communication node to:

obtain a power of a digital signal sample received by the receiver;

generate, according to a model, a plurality of model values corresponding to a plurality of powers of the received signal; and cancel intermodulation interference by multiplying the received digital signal sample with at least one model value of the plurality of model values, thereby obtaining an output digital signal sample from which intermodulation interference, inflicted by the receiver, is cancelled.

* * * * *

UNITED STATES PATENT AND TRADEMARK OFFICE
CERTIFICATE OF CORRECTION

PATENT NO. : 10,411,743 B2
APPLICATION NO. : 15/927507
DATED : September 10, 2019
INVENTOR(S) : Heinikoski et al.

Page 1 of 1

It is certified that error appears in the above-identified patent and that said Letters Patent is hereby corrected as shown below:

In the Specification

In Column 1, Line 7, delete "2015," and insert -- 2015, now Pat. No. 9,960,797, --, therefor.

Signed and Sealed this
Eighteenth Day of February, 2020

Andrei Iancu
*Director of the United States Patent and Trademark Office*